(12) United States Patent
Su et al.

(10) Patent No.: US 10,276,215 B1
(45) Date of Patent: Apr. 30, 2019

(54) DATA STORAGE DEVICE FASTENER SEAL SYSTEM

(71) Applicant: Seagate Technology LLC, Cupertino, CA (US)

(72) Inventors: Ying Su, Singapore (SG); Pow Ming Yap, Singapore (SG); Kok Liang Cho, Melaka (MY); Chee Xian Lee, Singapore (SG)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/830,087

(22) Filed: Dec. 4, 2017

(51) Int. Cl.
G11B 33/14 (2006.01)

(52) U.S. Cl.
CPC .................. G11B 33/1446 (2013.01)

(58) Field of Classification Search
None
See application file for complete search history.

(56) References Cited

U.S. PATENT DOCUMENTS

| | | | |
|---|---|---|---|
| 4,896,231 A * | 1/1990 | Hoppe | G11B 25/043 360/99.15 |
| 5,097,978 A | 3/1992 | Eckerd | |
| 5,150,267 A | 9/1992 | Reinisch | |
| 5,270,887 A | 12/1993 | Edwards et al. | |
| 5,301,075 A * | 4/1994 | Takemoto | G11B 25/043 360/99.22 |
| 5,422,766 A | 6/1995 | Hack et al. | |
| 5,602,697 A * | 2/1997 | Jeong | G11B 19/2018 360/99.08 |
| 5,691,860 A | 11/1997 | Hoppe | |
| 5,703,734 A | 12/1997 | Berberich et al. | |
| 5,793,566 A | 8/1998 | Scura et al. | |
| 6,168,459 B1 | 1/2001 | Cox et al. | |
| 6,256,165 B1 * | 7/2001 | Kim | G11B 25/043 360/97.19 |
| 6,377,420 B1 * | 4/2002 | Tadepalli | G11B 25/043 360/97.19 |
| 6,490,242 B1 | 12/2002 | Bonn et al. | |
| 6,525,899 B2 | 2/2003 | Hearn et al. | |
| 6,631,049 B2 * | 10/2003 | Satoh | G11B 25/043 277/632 |
| 7,082,011 B2 * | 7/2006 | Nakamura | G11B 33/08 360/97.13 |
| 7,218,473 B2 | 5/2007 | Bernett et al. | |

(Continued)

FOREIGN PATENT DOCUMENTS

| | | | |
|---|---|---|---|
| JP | 04289578 A | * | 10/1992 |
| JP | 2001229650 A | * | 8/2001 |
| JP | 2007200426 A | * | 8/2007 |

Primary Examiner — William J Klimowicz
(74) Attorney, Agent, or Firm — Hall Estill Attorneys at Law

(57) ABSTRACT

A data storage device fastener seal system can have at least a base, a cover, and a fastener seal. The base may have at least one fastener aperture and a first contact surface while the cover can have a second contact and a fastener hole. The second contact surface may physically contact the first contact surface to enclose a data storage region. The fastener seal can be positioned between the base and cover proximal the fastener aperture with the fastener seal extending less than an inch from the fastener aperture in every direction along a plane parallel to the first and second contact surfaces.

20 Claims, 4 Drawing Sheets

(56) References Cited

U.S. PATENT DOCUMENTS

| | | | | |
|---|---|---|---|---|
| 7,359,144 | B2* | 4/2008 | Xu | G11B 5/11 |
| | | | | 264/271.1 |
| 7,733,599 | B2* | 6/2010 | Shigenaga | G11B 33/1433 |
| | | | | 360/99.15 |
| 9,508,393 | B1* | 11/2016 | Le | G11B 33/1466 |
| 2005/0225893 | A1* | 10/2005 | Nakamura | G11B 33/08 |
| | | | | 360/97.13 |
| 2010/0232059 | A1* | 9/2010 | Choi | G11B 33/1466 |
| | | | | 360/97.12 |
| 2013/0003338 | A1* | 1/2013 | Lu | G11B 33/124 |
| | | | | 361/807 |

* cited by examiner

DATA STORAGE DEVICE FASTENER SEAL SYSTEM

SUMMARY

A data storage device fastener seal system, in some embodiments, has a base, a cover, and a fastener seal. The base has at least one fastener aperture and a first contact surface while the cover has a second contact and a fastener hole. The second contact surface physically contacts the first contact surface to enclose a data storage region. The fastener seal is positioned between the base and cover proximal the fastener aperture with the fastener seal extending less than an inch from the fastener aperture in every direction along a plane parallel to the first and second contact surfaces.

DETAILED DESCRIPTION

Various embodiments of the present disclosure are generally directed to a data storage device employing a fastener seal system to prevent contaminants from entering the data storage device and degrading performance.

Consumer demand for increased data storage capacity has emphasized the operating tolerances of data accessing components. A reduction in operating tolerances can result in higher sensitivity to operating variations. For instance, the presence of solid particles can more quickly lead to data storage device errors and failure when operating tolerances are decreased.

The sealing of a data storage device can be completely with sealing components, such as gaskets and tape, that fit between planar surfaces to plug a seam, hole, aperture, or crack where contaminates can enter the data storage device. However, reduction in contacting surface area in a data storage device decreases the availability and effectiveness of gaskets and tape to seal a data storage device. Hence, various embodiments are directed to a fastener seal system that can effectively seal portions of a data storage device to reduce the risk that contaminates will enter and degrade the data storage device.

Figure 1:
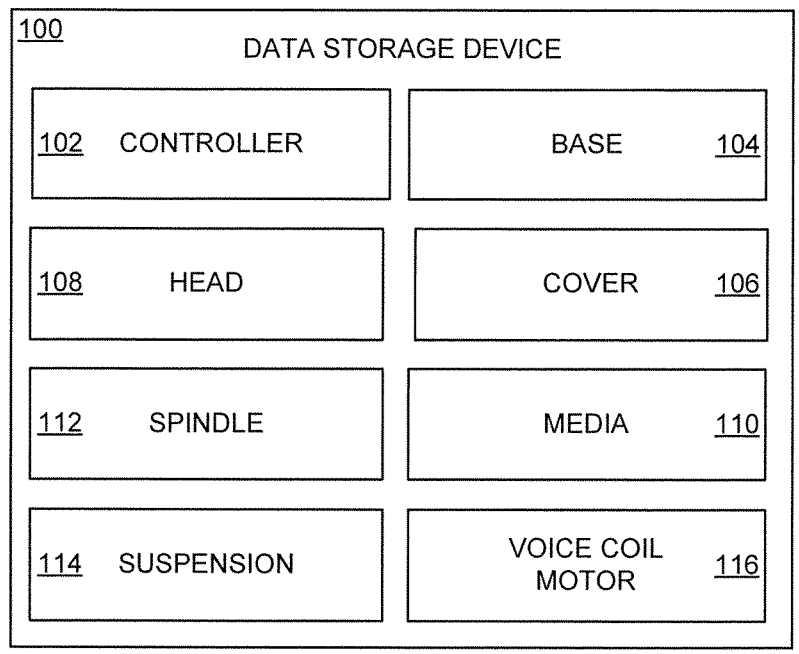
FIG. 1 is a block representation of an example data storage device arranged in accordance with various embodiments.

FIG. 1 is a block representation of an example data storage device 100 in which a fastener seal system can be practiced in accordance with various embodiments. One or more controllers 102, such as a microprocessor or programmable processor, can be housed within a data storage region enclosed by the base 104 and cover 106.

The controller 102 can direct data access operations via a transducing head 108 to, and from, one or more magnetic data storage media 110 rotated by a central spindle motor 112. The transducing head 108 is maintained a predetermined height (air bearing) above a data storage medium 110 by a transducing suspension 114 that can be articulated with respect to the medium 108 by the voice coil motor 116 to position the head 108 over various data tracks of the data storage media 110.

Figure 2:
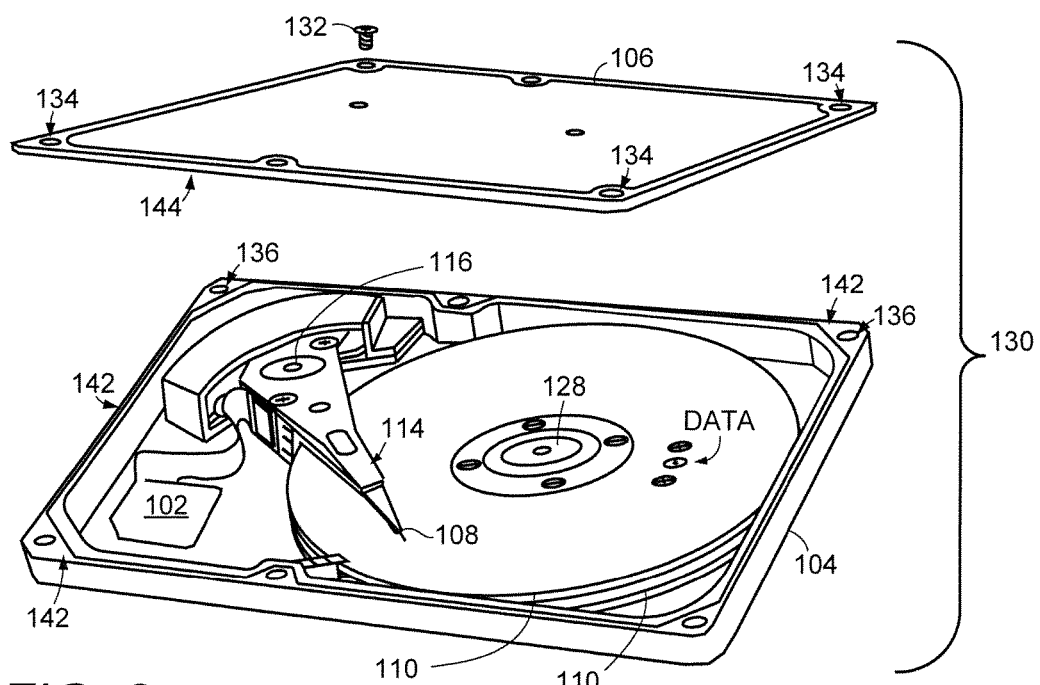
FIG. 2 displays a line representation of an example data storage device where various embodiments may be practiced.

FIG. 2 illustrates a line representation of portions of an example data storage device 130 arranged in accordance with some embodiments to employ a fastener seal system. The data storage device 130 is shown in a partially exploded manner with the cover 106 separated from the base 104. The cover 106 can be attached to the base 104 via one or more fasteners 132, which can be threaded screws, rivets, magnets, and pins, without limitation.

The respective fasteners 132 can extend through a fastener hole 134 in the cover 106 and into a fastener aperture 136 in the base 104 to secure the cover 106 to the base 104. Such base 104 and cover 106 assembly can enclose, and potentially seal, the data storage region 138 where the data storage assembly 140 is positioned. For clarity, the data storage assembly 140 can comprise the data storage media 110, head 108, spindle 112, and transducing suspension 114.

Mechanically, the base 104 has a first contact surface 142 that physically mates with a second contact surface of the cover 106 to form a singular data storage device housing. While the first and second contact surfaces 142/144 may be planar and parallel, contaminates may still be able to enter the data storage region 138. It is contemplated that the exterior of the base 104 and cover 106 can be covered, such as with tape or wax, in an attempt to seal the seam between the base 104 and cover 106. In yet, contaminates may enter the data storage region 138 even with the exterior of the data storage housing sealed and/or being air-tight.

Figure 3A:
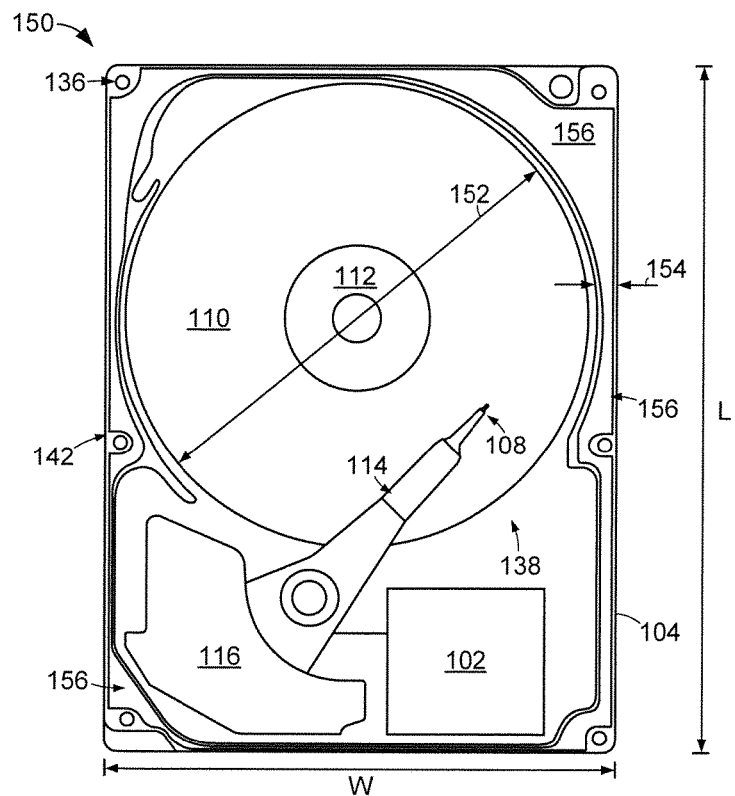
FIGS. 3A and 3B respectively show portions of an example data storage device arranged in accordance with some embodiments.
Figure 3B:
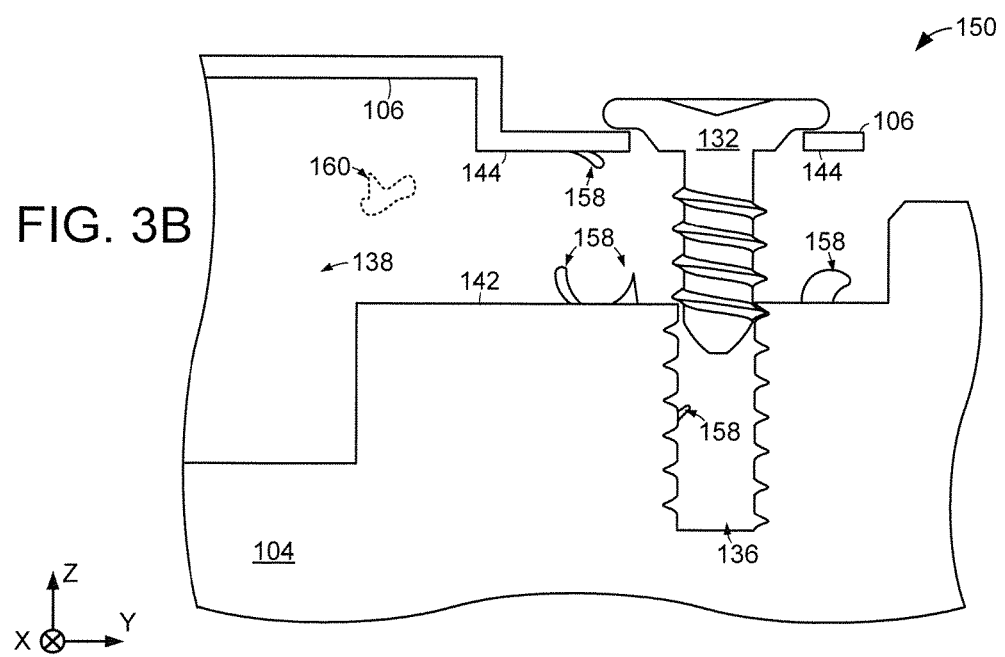

FIGS. 3A and 3B depict line representations of portions of an example data storage device 150 configured in accordance with various embodiments. The top view of FIG. 3A shows how the size of the data storage media 110 contributes to the size of the first contact surface 142 of the base 104. That is, a larger medium radius/diameter 152 reduces the surface area of the contact surface 142 for a standardized device form factor, such as 2.5" and 3.5", as conveyed as the minimum width 154 of the surface 142 in the X-Y plane.

The reduction in the available surface area of the base contact surface 142, such as due to a larger data storage region 138 sized to accommodate a media 110 with larger radii 152, can make the use of a gasket 156 less effective, due at least in part to smaller volumes of gasket material that are difficult to install and retain, particularly in the small surface width 154 portions of the base 104. Thus, a single-piece gasket 156, such as formed-in-place gaskets (FIPG) cannot reliably be utilized to seal a data storage device 150 with reduced contact surface 142 surface area.

Despite smaller contact surfaces and no use of a gasket 156 that continuously extends about the data storage region 138, the data storage region 138 can be effectively sealed from external particles that can degrade data storage performance. However, particles created from within the outer periphery of the device 150, as defined by the exterior dimensions (W/L) of the base, can enter the data storage region 138 over time and degrade data storage performance, particularly after experiencing operating and/or non-operating shock.

The cross-sectional side view of FIG. 3B shows how harmful particles can be created from within the data storage device 150. While the base 104 and cover 106 can be constructed with relative precision out of reliable materials, such as metals or high durometer-rated plastics, manufacturing operations can result in surface roughness in the form of one or more burrs 158. A burr 158 can extend from the any portion of the base 104, such as the fastener aperture 136 and/or first contact surface 142, or cover 106, such as the second contact surface 144, in a cantilevered manner that jeopardizes operation of the data storage device 150.

As a non-limiting example, the presence of a burr 158 in fastener aperture 136 can cause a threaded fastener 132 to cross-thread and not properly seat the contacts surfaces 142/144 of cover 106 and base 104. A burr 158 extending from either contact surface 142/144 can scratch, dent, cut, and scrape the opposing contact surface 142/144, which decreases the sealing capability of the base/cover seam. The cantilevered nature of a burr 158 corresponds with a high risk of physical separation, as shown by segmented particle 160, as a result of data storage device 150 assembly and/or shock and vibration occurring during, and between, data access operations.

Such a loose particle 160 can migrate into the data storage region 138 of the device 150 and cause damage. For instance, a particle 160 comprising a rigid material can land on a recording surface of a magnetic medium in the data storage region 138. Contact of a rigid particle on a recording surface can damage one or more layers of the medium, which corresponds with data access errors, such as air bearing volatility.

It is contemplated that a sealing member, such as a gasket, can be positioned between the first 142 and second 144 contact surfaces to decrease the migration and damage caused by burrs 158. However, the decreased width 154 and surface area of the base contact surface 142 prevent a gasket from effectively being installed. Therefore, various embodiments are directed to a fastener sealing system that mitigates the effects of burrs 158 despite having too little base contact surface 142 area to utilize a single continuous gasket 156.

Figure 4A:
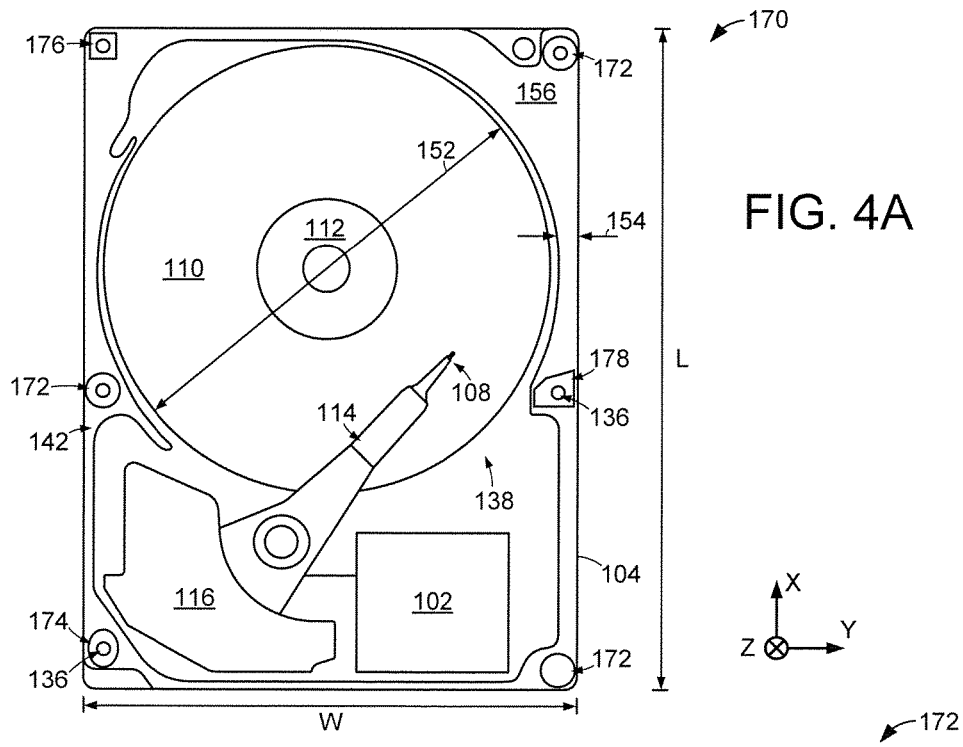
FIGS. 4A-4B respectively depict portions of an example data storage device configured and operated in accordance with assorted embodiments.
Figure 4B:
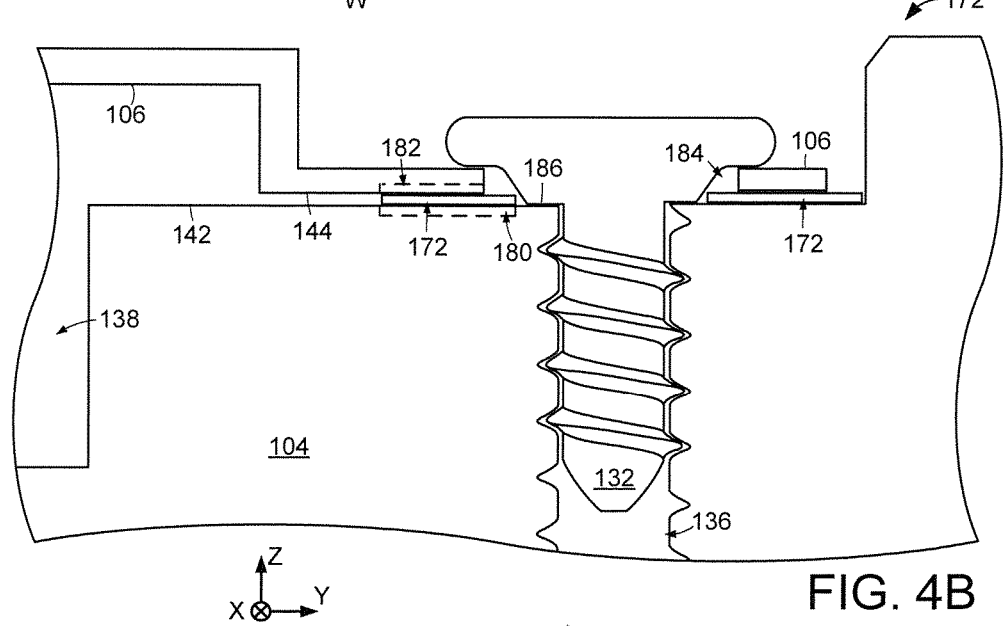

FIGS. 4A and 4B respectively illustrate portions of an example data storage device 170 configured and operated in accordance with various embodiments. FIG. 4A conveys a top view line representation of a base 104 that has a first contact surface 142 that has insufficient surface area, as a product of one or more small widths 154, to efficiently support a single gasket-type sealing member. For the sake of clarity, the lack of surface area of the first contact surface 142 make installation of a single-piece gasket sealing member time consuming, retention of a gasket difficult during assembly, and the sealing capability of a gasket diminished.

Instead of a single-piece sealing member, the data storage area 138 can be protected from unwanted particles 160 via one or more fastener seals 172 positioned proximal the respective fastener apertures 136 of the base 104. The various fastener seals 172, as shown in FIG. 4A, can be isolated around each fastener aperture 136, such as extending no farther than 1 inch, 0.5 inches, or 0.1 inches from the center of the respective apertures 136.

It is contemplated that each fastener seal 172 has a matching configuration, such as dimensions, material, and shape. In yet, some embodiments arrange the fastener seals 172 with dissimilar configurations. The non-limiting arrangement shown in FIG. 4A conveys how assorted fastener seals 172 can have a substantially circular shape, oval shape 174, rectangular shape 176, and trapezoidal shape 178. The dissimilar shapes of the fastener seals 172 may, or may not, correspond with different materials, such as polyester, nylon, or other fabrics, or with different thicknesses, such as uniform or varying thicknesses measured along the Z axis.

It is noted that a fastener seal 172 is not required to have a fastener opening and can, instead, be configured as a continuous layer of material or as a layer with one or more perforations. Such seal configuration can more completely engage the fastener 132 and fastener aperture 136 during assembly. Moreover, installation of the fastener seals 172 can be reduced by not having to align the seal opening with the fastener aperture 136.

While the material of the various fastener seals 172 is not limited, some embodiments utilize a material with a durometer rating that is less than the overcoat layer of a data storage medium. Such "soft" material of the seal fasteners 172 allows for efficient trapping of loose particles that could damage the data storage medium and/or the data access components of the data storage device 170. Also, soft fastener seal materials provide a level of safety in that if portions of the seal(s) 172 separate and enter the data storage region 138, the particles are less likely to inflict less damage and cause fewer data access errors than rigid particles.

The placement of the assorted fastener seals 172 may be aided by varying thickness portions of the first contact surface 142. For example, regions of the first contact surface 142 may be recessed, notched, or raised to facilitate efficient and accurate installation of the fastener seals 172 prior to the installation of fasteners 132 as well as increased retention of the seals 172 during assembly of the base 104 and cover 106. It is contemplated, but not required, that at least one fastener seal 172 is affixed to the first contact surface 142, such as with an adhesive or tape.

FIG. 4B displays how a fastener seal 172 can be positioned between the first 142 and second 144 contact surfaces to prevent any burrs from damaging the respective surfaces proximal the fastener aperture 136 and trap loose rigid particles from reaching the data storage area 138. The soft material selection of the fastener seals 172 allows each seal to deform along the X-Y plane in response to tightening of the fastener 132 without altering the height form factor of the data storage device 170 or the relationship of the contact surfaces 142/144. However, some embodiments arrange recessed portions 180 of the base 104, portions 182 of the cover 106, or both, to allow the contact surfaces 142/144 increased physical contact.

The fastener seal 172 can be a lamination of multiple different materials that can be customized for the operational characteristics of the data storage device 170. For example, a device 170 that is intended to be air-tight and filled with an inert gas other than air, such as helium or argon, may have a fastener seal 172 that has increased sealing properties, such as a lamination of different materials, like metal, rubber, and polyester. As another example, a data storage device 170 expected to have relatively high instances of operating shock and vibration, such as in a data storage rack or enclosure with other data storage devices, may be configured with a one-piece, or laminated, fastener seal 172 configured to dampen physical movement.

The position of the fastener seal 172 relative to the fastener 132 can also be tuned to provide a balance of sealing and physical movement dampening. Although not required or limiting, the fastener can be configured with a cover recess 184 that accommodates the cover 106 and fastener seal 172 and a third contact surface 186 that contacts the first contact surface 142. That is, the recess 184 can be customized to apply a predetermined amount of pressure, and allow a predetermined amount of movement and vibration transfer, through the cover 106 and fastener seal 172. The direct physical contact of the third 186 and first 142 contact surfaces ensures a proper tightness of the fastener 132 and position of the cover 106 relative to the base 104.

In contrast, if the fastener seal 172 extended between the third 186 and first 142 contact surfaces, the fastener 132 may not be fully tightened or may more easily loosen over time as a result of operational shock and vibration. Hence, the fastener seal 172 can be configured to protect the data storage region 138 from surface imperfections, burrs, and loose particles without physically contacting the fastener 132 and instead being positioned in close proximity to the fastener aperture 136 under the recess 184 of the fastener 132 along the Z axis.

The ability to customize the material, thickness, size, and shape of the fastener seal 172 complements the intended position of the seal 172 relative to the fastener 132 to provide a seal system that is efficient to install, reliably assembled, and effective in balancing physical movement dampening with data storage region 138 sealing. That is, the fastener seal 172 can be configured in a plethora of different arrangements in consideration of the configuration and use of the fastener 132 in order to provide optimal data access performance despite reduced first contact surface 142 size and area. As a non-limiting example, multiple fastener seals 172 can be used in place of a single sealing gasket to buffer physical contact of the first 142 and second 144 contact surfaces while mitigating the risk of burrs degrading data storage device 170 performance.

Figure 5:
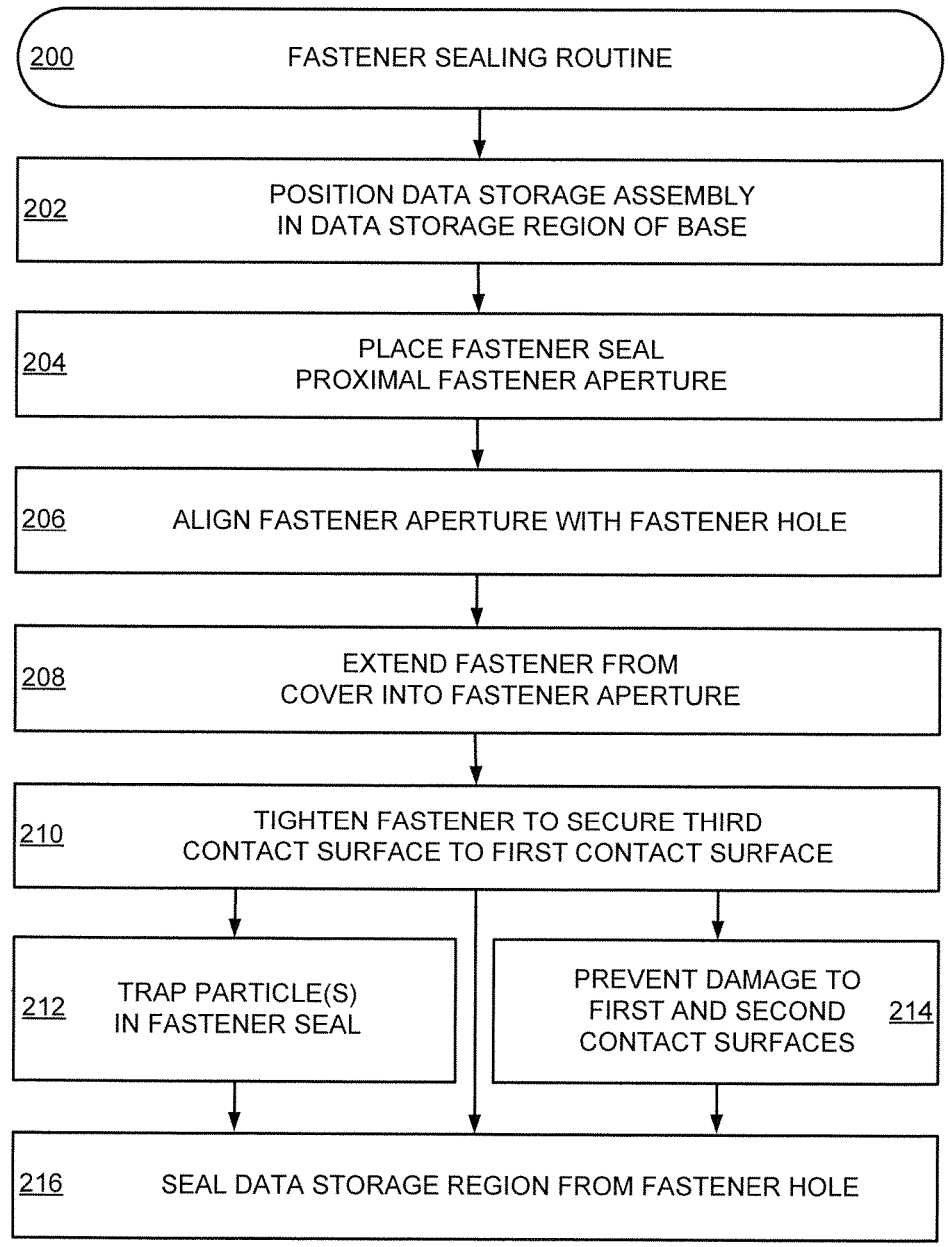
FIG. 5 provides a flowchart for an example fastener sealing routine performed with the various embodiments of FIGS. 1-4B.

FIG. 5 is a flowchart of an example fastener sealing routine 200 that can be carried out in the assorted embodiments conveyed in FIGS. 1-4B. The routine 200 can occur partially, or completely, during manufacturing and before a data storage device is shipped to an end-user. However, the various aspects of routine 200 can optimize data storage performance when the data storage device is employed to conduct data access operations as directed by an end-user.

Initially, a base is provided that has a data storage region defined by one or more recessed areas. It is contemplated that the base is a standardized form factor with the data storage region sized to fit data storage media having a standardized diameter, such as 2.5", or a non-standardized diameter, such as 65.5-69.5 mm. Such larger, non-standardized media can correspond with reduced first contact surface size so that a single-piece sealing gasket cannot efficiently be installed or effectively mitigate the risk of unwanted rigid particles entering the data storage region of the base.

Step 202 positions a data storage assembly in the data storage region of the base. The data storage assembly may comprise data storage media, transducing heads, transducing assembly, a spindle motor, a voice-coil motor, and a controller, but not all components are required or are limited to position within the data storage region of the base. The activity of step 202 can result in the base being ready to receive a cover and enclose the data storage assembly in the data storage region.

Step 204 places at least one fastener seal proximal a fastener aperture of the base. Step 204 may further involve the specific installation of different fastener seals around, and perhaps over, each of the various fastener apertures so that no aperture is present without a fastener seal. In some embodiments, the placement of step 204 is accompanied by adhesion of a portion of the fastener seal to the first contact surface of the base. Such adhesion may be facilitated with external means, such as glue or tape, or with internal means, such as an adhesive layer incorporated in the fastener seal.

Step 204 may also involve alignment of the respective fastener seals so that a fastener opening of the seal is aligned with the centerpoint of the underlying fastener aperture. Non-uniform thickness regions of the first contact surface, such as ridges, notches, and recesses, can aid in alignment of the seal opening and fastener aperture, but such features are not required or limiting.

Next, step 206 positions the cover over the base so that the respective fastener apertures of the base, and the seal openings, are aligned along an axis perpendicular to the first contact surface. The fastener is then inserted through the faster hole of the cover in step 208 through the seal opening and into the fastener aperture. In the event a threaded fastener is utilized, step 210 proceeds to articulate the fastener to procure physical contact of the third contact surface of the fastener with the first contact surface of the base. It is contemplated, but not required, that step 210 also secures the second contact surface of the cover into physical engagement with the first contact surface, which results in a singular data storage device housing comprising the cover and base.

The presence of the fastener seals proximal the fastener apertures and fasteners allows loose particles to be trapped in step 212, damage from cantilevered burrs to be prevented in step 214, and the data storage region to be sealed in step 216. The activity of steps 212, 214, and 216 can occur concurrently, sequentially, and sporadically, without limitation. By reducing the risk of rigid particles from being generated and entering the data storage region, optimized data access performance of the assembled data storage device can be maintained over time despite experiencing physical trauma, shock, and vibration.

It is noted that the various aspects of routine 200 are not required or limiting. As such, any aspect can be changed or removed and any number of steps and decisions can be added. Through the execution of routine 200, a data storage device employs one or more fastener seals to provide a buffer between the fasteners, fastener apertures, and exterior environment despite the first contact surface not having enough surface area to accommodate a gasket sealing member. The ability to tune the performance of the fastener seal(s) in a data storage device allows increased data storage media diameters to be utilized without sacrificing structural integrity of the data storage housing or data access performance over time.

It is to be understood that even though numerous characteristics and configurations of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. For example, the particular elements may vary depending on the particular application without departing from the spirit and scope of the present technology.

What is claimed is:

1. An apparatus comprising:
   a base, the base having at least one fastener aperture and a first contact surface;
   a cover having a second contact surface physically contacting the first contact surface to enclose a data storage region, the cover comprising a fastener hole; and
   a fastener seal positioned between the base and cover proximal the fastener aperture, the fastener seal extending less than an inch from the fastener aperture in every direction along a plane parallel to the first and second contact surfaces.

2. The apparatus of claim 1, wherein the data storage region houses a data storage medium and transducing assembly.

3. The apparatus of claim 1, wherein the fastener seal is adhered to the first contact surface via an adhesive.

4. The apparatus of claim 1, wherein the fastener seal covers at least one burr extending from the first contact surface.

5. The apparatus of claim 1, wherein the fastener seal traps at least one loose particle, the at least one loose particle comprising a material of the base or cover.

6. The apparatus of claim 1, wherein the fastener seal comprises a first material, the base comprises a second material, and the cover comprises a third material, the first material being different than the second and third materials.

7. The apparatus of claim 1, wherein the fastener seal continuously extends to surround the fastener aperture.

8. The apparatus of claim 1, wherein the fastener hole and fastener aperture are occupied by a single threaded fastener.

9. The apparatus of claim 8, wherein the single threaded fastener comprises a third contact surface in physical contact with the first contact surface, the first and third contact surface being parallel.

10. The apparatus of claim 1, wherein the seal fastener seal comprises a polyester material.

11. A system comprising:
a base, the base having separate first and second fastener apertures and a first contact surface;
a cover having a second contact surface physically contacting the first contact surface to enclose a data storage region, the cover comprising separate first and second fastener holes;
a first fastener seal positioned between the base and cover proximal the first fastener aperture, the fastener seal positioned in a depression in the base and extending less than an inch from the first fastener aperture in every direction along a plane parallel to the first and second contact surfaces, the first fastener seal comprising a material with a durometer rating less than an overcoat layer of a data storage medium positioned between the base and cover; and
a second fastener seal positioned between the base and cover proximal the second fastener aperture, the first and second contact surfaces continuously contacting to separate the first fastener seal from the second fastener seal.

12. The system of claim 11, wherein the depression comprises a reduced thickness, the thickness measured perpendicular to the first contact surface.

13. The system of claim 11, wherein the depression is shaped to match the first fastener seal.

14. The system of claim 11, wherein the first fastener seal comprises a fastener void aligned with the first fastener aperture and the first fastener hole.

15. The system of claim 11, wherein the first fastener seal is perforated in a fastener region, the fastener region aligned with the first fastener aperture and the first fastener hole.

16. The system of claim 11, wherein the first fastener seal seals the fastener aperture without contacting a fastener occupying the first fastener hole and the first fastener aperture.

17. The system of claim 11, wherein the first fastener seal is a lamination of first and second layers each comprising different materials.

18. A method comprising:
presenting a base having at least one fastener aperture and a first contact surface;
positioning a fastener seal on the first contact surface proximal the fastener aperture, the fastener seal extending less than an inch from the at least one fastener aperture in every direction along a plane parallel to the first contact surface;
placing a cover having a second contact surface in physical contact with the first contact surface and fastener seal to enclose a data storage region, the cover comprising a fastener hole aligned with the fastener aperture; and
mating the base and cover with a fastener continuously extending through the fastener hole into the fastener aperture.

19. The method of claim 18, wherein the data storage region is air-tight and is filled with an inert gas other than air.

20. The method of claim 18, wherein the fastener seal disintegrates into seal particles over time, the seal particles resident in the data storage region without causing a data storage assembly to fail.

* * * * *